April 14, 1942.  H. R. ELLINWOOD  2,279,865
SUPPORTING CLIP
Filed Aug. 24, 1940
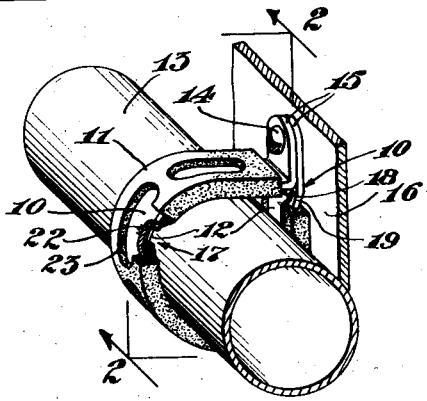
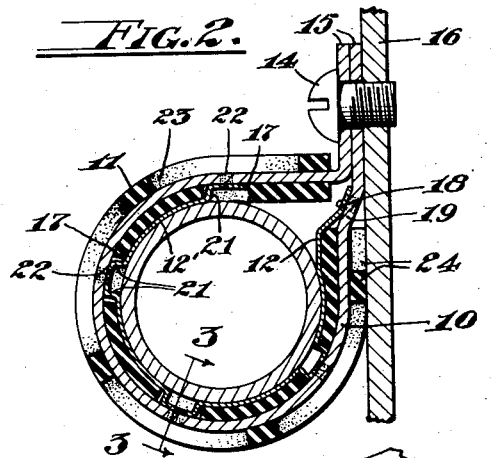
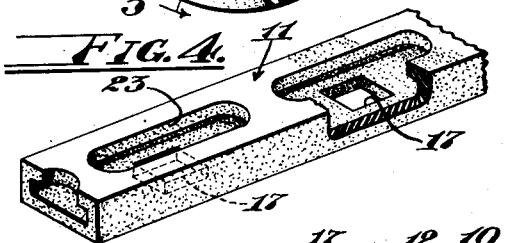
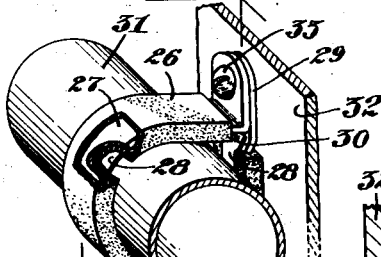
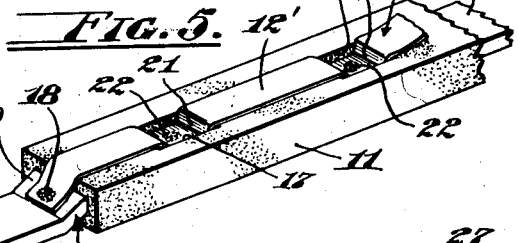
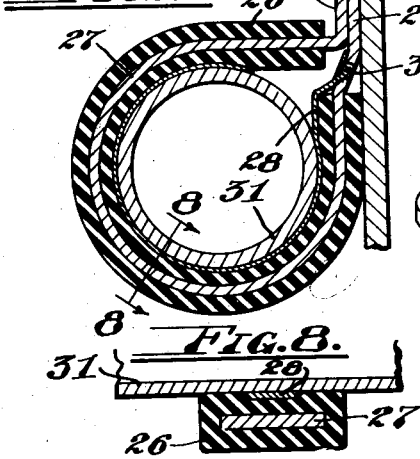
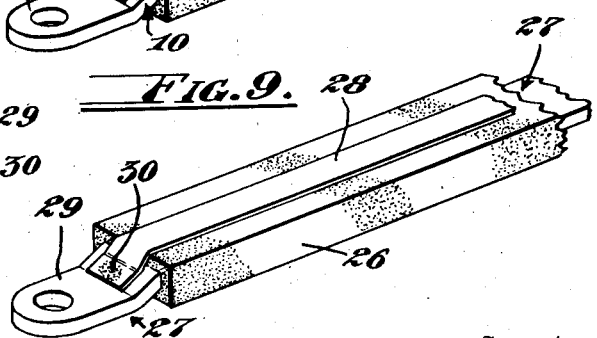
Inventor
Herman Ray Ellinwood
By R. S. Berry
Attorney Patented Apr. 14, 1942

2,279,865

UNITED STATES PATENT OFFICE 2,279,865

SUPPORTING CLIP

Herman Ray Ellinwood, North Hollywood, Calif., assignor to Adel Precision Products Corp., Burbank, Calif., a corporation of California Application August 24, 1940, Serial No. 354,104

8 Claims. (Cl. 174—40)

The present invention relates to improvements in pipe or conduit supporting clips of the types shown in my application entitled "Strip for forming conduit supports," Ser. No. 326,994, filed March 30, 1940, and in the Paul W. Adler patent for "Line supporting clip," No. 2,215,283, issued September 17, 1940, said clips being especially designed for supporting metallic pipes or conduits such as form the air, oil, fuel and other fluid lines, or which house the control cables and the electrical conductors in aircraft.

In fitting such pipes or conduits throughout an aircraft it is necessary to secure them at many points to adjacent structures so as to reduce vibration and prevent relative movement of the conduits or pipes and said structures as well as ground the pipes or conduits to prevent static electrical accumulation in the pipes or conduits. The clips of the hereinbefore identified applications and the present invention are designed to support the pipes or conduits in a particularly efficacious manner and hundreds of thousands of such clips have been and are now being used exclusively by several of the largest aircraft manufacturers in the construction of modern aircraft.

The primary purpose of the present invention is to provide a clip of the character described which will provide certain advantages and improvements which are not as efficaciously provided in similar clips heretofore used; relative simplicity of construction reduction of the number of parts, greater adaptability to pipes and conduits of varying diameter, comparative ease and simplicity of manufacture, increased ruggedness and strength, saving in material and costs of manufacture and installation, and a more reliable grounding of the pipes or conduits to the metal structure of the aircraft, being among the essential advantages and improvements thus provided.

A further purpose of the invention is to provide in a clip of the character described a tubular form of resilient cushion through the bore of which a bendable metal strap is inserted so that the loop portion of the strap is covered by the cushion while the free end portions of the strap are bare and adapted to be secured to the structure on which it is desired to support the pipes or conduits. The tubular form of the cushion provides for a quicker and easier assembling of the clip, insures that the cushion remain in proper place on the strap, and affords a better and positive fixation as by welding, of the metallic static discharge strip to the metal strap, while at the same time effectively holds said strip in contact with the pipe or conduit.

Another purpose of the invention is to provide in a clip of the character described a novel and efficient arrangement of the tubular cushion and metal strap for forming the body of the clip, said cushion having the wall thereof which lies upon the inner surface of the loop portion of the strap, formed with one or more apertures affording access to said loop portion between the ends of the cushion whereby the metal grounding or static discharge strip may be readily extended into said openings by a welder for easily and effectively spot welding such portions to the loop portion of the strap.

With the foregoing objects in view, together with such other objects and advantages as may subsequently appear, the invention is carried into effect as illustrated by way of example in the accompanying drawing, in which:

Fig. 1 is a fragmentary perspective view of a clip embodying my invention as when used to support a pipe or conduit on and in electrically grounded relation to a metallic structure as in aircraft;

Fig. 2 is a sectional view taken on the plane of line 2—2 of Fig. 1;

Fig. 3 is an enlarged section taken on the line 3—3 of Fig. 2;

Fig. 4 is a fragmentary perspective view of the tubular cushion as shown in Figs. 1, 2 and 3;

Fig. 5 is a fragmentary perspective view of the cushion of Fig. 3, and the metallic strap and grounding strip as when assembled prior to bending the structure to form the clip shown in Figs. 1, 2, and 3;

Fig. 6 is a fragmentary perspective view of a modified form of the invention;

Fig. 7 is an enlarged section taken on the plane of line 7—7 of Fig. 6;

Fig. 8 is a fragmentary section taken on the line 8—8 of Fig. 7; and

Fig. 9 is a fragmentary perspective view of the assembled strap, cushion, and grounding strip of the form of the invention shown in Figs. 6, 7, and 8 and as before the structure is bent into clip form.

Referring to the drawing more specifically, the embodiment of the invention shown in Figs. 1 to 5 inclusive generally includes a clip comprising bendable resilient metal strap 10, a tubular, elastic and compressible cushion 11 through the bore of which the strap extends, a metallic grounding or static discharging strip 12 in electrical contact with the metal strap and exposed on the cushion for contact with a pipe or conduit 13, and a fastening element 14 for securing at least one of the apertured free end portions 15 of the strap to a metallic structure 16, after the strap and cushion are bent to form a cushioned loop for embracing the pipe or conduit. The cushion may be formed of soft rubber or the like, and is preferably made of a rubber-like substance which is acid, and oil proof, such as synthetic rubber known as "Neoprene" or "Adelite." Such a cushion will prevent damaging and otherwise objectionable vibrations of the pipe in the clip and permit of accommodation of the clip to "off-sized" pipe and conduit and as well as to pipes and conduits of different diameters, and also afford full cushioned supports for the pipe or conduit throughout the structure to which the pipes, or conduits are attached. These pipes or conduits for example may comprise the fluid conducting lines and the electrical conductor and operating cable conduit lines of an aircraft.

The grounding or static discharging strip 12 provides for grounding of the pipes or conduits to the metal structure 16, said structure being for example the metal structural components of an aircraft, whereby to prevent accumulation of static electricity in the fluid conducting, conduit and other lines of the aircraft.

In the clips of the applications for patent hereinbefore noted, the cushions for the metal straps are grooved or channelled to receive the straps for forming the clips and require the stretching of the cushions to fit the straps into and cause the same to be gripped and held in the grooves or channels by means of retaining flanges or like portions which are arranged to overlie the straps.

In the present invention the cushions 12 are tubular and the straps may be much more easily and quickly inserted therethrough without appreciably stretching the material. The tubular form of cushion provides a better cushioning action in fully enclosing the metal strap except the end portions 15 which project from the ends of the cushion and are therefore bare to afford connection thereof with the metal structure 16, as aforesaid. Moreover the tubular cushion grips the strap throughout the length of the cushion, that is, the areas of the walls of the bore thereof whereby to more effectively hold the strap and cushion assembled and prevent relative dislodgement or slipping of the cushion and strap especially while in the straight form as shown in Fig. 5. Thus it is unnecessary to provide interlocking protuberances and depressions and other innterfitting portions of the cushion and strap as in former clips, to hold these parts properly assembled.

As here shown the wall of the tubular cushion which lines the inner surface of the strap, in other words, the pipe or conduit engaging portion of the cushion is provided with a plurality of apertures 17 affording access to the bore of the cushion and the metal strap 10 therein. The grounding strip 12 is laid on this wall of the cushion and at least one end thereof is spot welded as at 18 or otherwise fixed to an angularly offset portion 19 of the strap which portion protrudes from an end of the cushion.

Intermediate portions of the strip 12 are bent or protruded into the apertures as at 21 so as to contact the strap 10 and are spot welded thereto as at 22. This provides a series of pipe or conduit contacting portions 12' between the portions 21 extended into the apertures 17. As here shown (see Fig. 2) the other end of strip 12 may be free and arranged to be clamped between the pipe or conduit and a terminal portion of the cushion adjacent the margin of one of the apertures 17. Inasmuch as one of the portions 21 is spot welded to the strap close to the free end of the strip, said free end and the strip as a whole are securely held against displacement. Not only does the strip 12 provide for better ground connections in being welded to the strap 10 and arranged as here shown and described, but the clip as a whole is reinforced and rendered more compact and reliable for its purposes. Moreover such construction and arrangement makes it possible to use a narrower grounding strip and thereby affords an increased cushioning area.

If desired the other or outer wall of the cushion may be provided with large and elongated apertures 23 to reduce the weight of the clip.

Another feature of importance as shown in Fig. 2 is that the tubular cushion provides for a more effective pad as at 24 between the structure 16 and portion of the clip adjacent the offset portion 19 of the strap, whereby to prevent vibration at this point.

Referring to Figs. 6 to 9 inclusive, a modified form of clip embodying my invention comprises an imperforate tubular cushion 26 through which the bendable metal strap 27 is extended in the same manner as in the first described form of the invention. A thin metallic grounding strip 28 is laid on the cushion and at least one end thereof is welded to one of the bare terminal portions 29 or at 30. This form is bent to provide a loop in the same manner as the first form and is used in the same manner as clearly shown in Figs. 6 and 7. It differs only from the first form in that the tubular cushion is imperforate and the strip 28 is welded at one end to the strap 27 and merely lies upon the inner surface of the cushion for substantially the full length thereof. This strip engages the pipe or conduit as seen in Figs. 6, 7, and 8, while the ends 29 are secured to the metallic support 32 by means of a screw 33.

An important provision of this invention is that the strap is tensioned, and the cushion is under compression while the grounding strip is substantially static, inert or substantially non-tensioned, when the clip of any of the forms hereof is in use. By having these parts arranged as aforesaid and the strip free from appreciable tension as accomplished by forming the strip of thin, flexible, soft or foil-like material, and mounting the strip so that it will move without resistance or substantially "float" with the cushion, as the latter is compressed, a good electrical contact of the strip with the strap and line is insured, and such relative movement as might produce undesirable friction and wear and tensioning and consequent breaking of the strip or rupturing of the weld joints or anchorage connection between the strip and strap is avoided, and at the same time the full cushioning action of the cushion is not impaired even where the strip lies between the line and the cushion.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a supporting clip, a bendable metallic strap formed into a loop portion for embracing a pipe or conduit and having separable free end portions at least one of which is adapted to be secured to a metallic structure on which it is desired to support the pipe or conduit in electrically grounded relation thereto, a resilient cushion lining the loop portion and leaving bare said end portions, and a metallic strip extending lengthwise of and overlying said cushion and one of said end portions for contact with said pipe or conduit and means for bonding said metallic strip with one of said bare end portions of said strap.

2. In a supporting clip, a bendable metallic strip formed into a loop portion for embracing a pipe or conduit and having separable free end portions at least one of which is adapted to be secured to a metallic structure on which it is desired to support the pipe or conduit in electrically grounded relation thereto, a resilient cushion lining the loop portion and leaving bare said end portions, said cushion having an aperture in the wall thereof which lies between the strap and the pipe or conduit, and a metallic strip having a portion extended into said aperture and contacting said strap and a portion exposed on and extending lengthwise of the cushion for contact with the pipe or conduit, also a portion overlying and fixed to one of the bared end portions of said strap.

3. In a supporting clip, a bendable metallic strip formed into a loop portion for embracing a pipe or conduit and having separable free end portions at least one of which is adapted to be secured to a metallic structure on which it is desired to support the pipe or conduit in electrically grounded relation thereto, a resilient cushion supported on and lining the loop portion and leaving bare said end portions, a metallic strip having an arcuate portion exposed on and overlying the cushion for contact with the pipe or conduit, and a portion overlying one of said bared end portions of the strap, and means for bonding said last named portion of said strip to said one end portion of the strap.

4. In a supporting clip, a bendable metallic strip formed into a loop portion for embracing a pipe or conduit and having separable free end portions at least one of which is adapted to be secured to a metallic structure on which it is desired to support the pipe or conduit in electrically grounded relation thereto, a resilient cushion lining the loop portion and leaving bare said end portions, and a metallic strip having an arcuate portion disposed on the cushion for contact with the pipe or conduit, said strip having a terminal thereof extended beyond an end of the cushion and overlying and welded to one of the end portions of the strap.

5. In a supporting clip, a bendable metallic strip formed into a loop portion for embracing a pipe or conduit and having separable free end portions at least one of which is adapted to be secured to a metallic structure on which it is desired to support the pipe or conduit in electrically grounded relation thereto, a resilient cushion lining the loop portion and leaving bare said end portions, said cushion having an aperture, a metallic strip having a portion extended into said aperture and contacting said loop portion of the strap and a portion exposed on the cushion for contact with the pipe or conduit, also a terminal portion extended beyond the cushion and overlying one of said end portions, and means permanently fixing said loop contacting portion and said terminal portion of said strip to said loop and end portions of the strap respectively.

6. In a supporting clip, a bendable metallic strap formed into a loop portion for embracing a pipe or conduit and having separable free end portions at least one of which is adapted to be secured to a metallic structure on which it is desired to support the pipe or conduit in electrically grounded relation thereto, a resilient cushion lining the loop portion of the strap and adapted to embrace the pipe or conduit, an elongated metallic grounding strip having a terminal portion overlying one end portion of the strap and another portion extending lengthwise along the cushion for contact with the pipe or conduit, and means for fixing said terminal portion of said strip to and electrically connecting it with said one end portion of the strap.

7. In a supporting clip for a metallic conduit line, a bendable line-embracing strap having separable end portions at least one of which is adapted to be secured to a metallic structure on which it is desired to support the line in electrically grounded relation thereto, a resilient line-embracing cushion on said strap and a metallic grounding member supported at one end only, by connection thereof with an end portion of the strap and having a flexible portion following the contour of the cushion and adapted to lie between the cushion and the conduit line.

8. In a supporting clip for supporting and electrically grounding a metallic conduit line, a metallic line-embracing strap having separable end portions adapted to be affixed to a metallic structure on which it is desired to support the line and so that the strap is tensioned for clamping the strap around the line, a compressible line-embracing cushion arranged to be compressed between the line and said strap, a flexible metallic grounding member for establishing an electrical ground connection between said strap and said line, means for non-yieldably affixing one end only of said grounding member to said strap to thereby support the grounding member in the assembly with a portion thereof free from connection with and overlying said cushion for yieldingly contacting said line, and means for affixing the end portions of the strap to said metal structure and placing the strap under tension for compressing the cushion between the strap and the line and maintaining the grounding member in contact with said line.

HERMAN RAY ELLINWOOD.